US011004257B1

(12) United States Patent
Han et al.

(10) Patent No.: US 11,004,257 B1
(45) Date of Patent: May 11, 2021

(54) METHOD AND APPARATUS FOR IMAGE CONVERSION

(71) Applicant: LG ELECTRONICS INC., Seoul (KR)

(72) Inventors: Soo Hyun Han, Gunpo-si (KR); Jung In Kwon, Seoul (KR); Min Cheol Shin, Gwangmyeong-si (KR); Seung Hyun Song, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/752,569

(22) Filed: Jan. 24, 2020

(30) Foreign Application Priority Data

Nov. 4, 2019 (KR) .................... 10-2019-0139580

(51) Int. Cl.
*G06T 15/20* (2011.01)
*G06T 7/194* (2017.01)
*G06T 5/00* (2006.01)

(52) U.S. Cl.
CPC ............ *G06T 15/205* (2013.01); *G06T 5/005* (2013.01); *G06T 7/194* (2017.01); *G06T 2207/10028* (2013.01); *G06T 2207/20084* (2013.01)

(58) Field of Classification Search
None
See application file for complete search history.

(56) References Cited

U.S. PATENT DOCUMENTS

| 2011/0069152 | A1* | 3/2011 | Wang ................ H04N 13/261 348/43 |
| 2019/0313071 | A1* | 10/2019 | Chen .................... G06T 11/00 |
| 2019/0354643 | A1* | 11/2019 | Shum .................... G06F 30/12 |
| 2020/0175700 | A1* | 6/2020 | Zhang ................... G06T 7/194 |
| 2020/0234451 | A1* | 7/2020 | Holzer ................... G06T 7/194 |

FOREIGN PATENT DOCUMENTS

| KR | 101181962 | 9/2012 |
| KR | 101519463 | 5/2015 |

* cited by examiner

*Primary Examiner* — Frank S Chen
(74) *Attorney, Agent, or Firm* — Lee, Hong, Degerman, Kang & Waimey PC

(57) ABSTRACT

A method and apparatus for image conversion according to an embodiment of the present disclosure includes receiving original image data, separating the original image data into a front view image and a back view image for performing 3D conversion processing of the original image data, and generating a converted 3D image by restoring a background space between the front view image and the back view image using a 3D conversion processing neural network. The 3D conversion processing neural network according to the present disclosure may be a deep neural network generated by machine learning, and input and output of images may be performed in an Internet of things environment using a 5G network.

17 Claims, 8 Drawing Sheets

METHOD AND APPARATUS FOR IMAGE CONVERSION

CROSS-REFERENCE TO RELATED APPLICATION

Pursuant to 35 U.S.C. § 119(a), this application claims the benefit of earlier filing date and right of priority to Korean Patent Application No. 10-2019-0139580, filed on Nov. 4, 2019, the contents of which are hereby incorporated by reference herein in its entirety.

BACKGROUND

1. Technical Field

The present disclosure relates to a method and apparatus for image conversion capable of converting a 2D image into a 3D image by classifying the 2D image into a front view image and a back view image using a depth-map, and converting the 2D image into a 3D image using a 3D conversion processing neural network that is suitable for restoring a background space between the classified front view image and back view image.

2. Description of Related Art

The following description is only for the purpose of providing background information related to embodiments of the present disclosure, and the contents to be described do not necessarily constitute related art.

Unlike existing 2D planar images, 3D stereoscopic imaging technology can significantly improve the quality of visual information by making an image similar to a real image that a person feels.

Specifically, 3D image conversion technology is technology that gives a three-dimensional effect to the 2D image (planar image), in which the image expresses depth and spatial shape information of objects in the image, as if seeing the objects with the human eye as in reality. 3D image conversion technology has various applications such as information communication, broadcasting, medical, education and training, military, games, animation, virtual reality, CAD, and industrial technology.

In a 3D image, the three-dimensional effect that a person perceives is obtained by a combination of a degree of change in a thickness of a lens according to the position of an object to be observed, a difference in an angle between both eyes and the object, a difference in the position and shape of an object seen by the left and right eyes, parallax caused by movement of the object, other psychological and memory effects, and the like.

Among these factors, the most important factor regarding the three-dimensional effect is binocular disparity caused by the fact that human eyes are positioned apart by about 6 to 7 cm in a horizontal direction. Human eyes look at an object with an angle difference due to binocular disparity, and this difference forms different images in each eye, both of which are transmitted to the brain through the retinas. The brain can precisely fuse the information from each eye with each other, to create for the person the feel of an original 3D stereoscopic image.

3D image conversion technology may be applied to various devices, such as a mobile phone, a TV, and a monitor, by being combined with at least one of the existing liquid crystal display (LCD), thin film transistor-liquid crystal display (TFT LCD), organic light-emitting diode (OLED), flexible display, and 3D display.

A method of extracting a depth-map from a target 2D image and performing 3D image conversion based on the extracted depth-map has been attempted.

Korean Patent Registration No. 10-1519463 relates to a 3D image conversion apparatus and method, and discloses a technology for addressing issues such as cracking and shaking during 3D conversion of text.

The above-mentioned document discloses a conversion method of a 3D image by extraction of a depth-map from a 2D image, but does not disclose a conversion method of a 2D image into a 3D image so that images acquire a three-dimensional effect using a neural network.

Korean Patent Registration No. 10-1181962 relates to a 3D stereoscopic image conversion apparatus and method, and discloses a technology for converting an existing 2D image (still and moving image) into a 3D stereoscopic image using technologies such as extraction of an object to give depth, tracking of the extracted object, providing depth to the extracted object and generating a depth-map, tracking of the generated depth-map, and the like.

Although the above-mentioned document discloses a method for converting a 2D image into a 3D image using a depth-map, it does not disclose a technology for converting 2D images into 3D images so that the images acquire a three-dimensional effect using a neural network.

In order to overcome the limitations described above, there is a need for a solution capable of effectively converting 2D images into 3D images using technology for converting 2D images into 3D images so that images acquire a three-dimensional effect using a neural network.

The background art described above may be technical information retained by the present inventors in order to derive the present disclosure or acquired by the present inventors along the process of deriving the present disclosure, and thus is not necessarily a known art disclosed to the general public before the filing of the present application.

SUMMARY OF THE INVENTION

An aspect of the present disclosure is to convert a 2D image into a 3D image using a neural network.

Specifically, the present disclosure is directed to separating several images included in one frame into front view images and back view images by selecting a depth map neural network suitable for selecting the front view image and the back view image, so as to efficiently convert a 2D image into a 3D image.

Another aspect of the present disclosure is to replace a plurality of frames including the same and/or similar images with one image that has been converted into a 3D image.

Specifically, upon determining that the images included in each of a plurality of frames that are consecutively arranged for less than a predetermined time are the same or similar, a first frame is selected and is converted from a 2D image into a 3D image, and each of the plurality of frames in which the images are determined to be same or similar are replaced with the converted frame, thereby shortening the time required to convert the 3D image.

Aspects of the present disclosure are not limited to the above-mentioned aspects, and other aspects and advantages of the present disclosure, which are not mentioned, will be understood through the following description, and will become apparent from the embodiments of the present disclosure. It is also to be understood that the aspects of the present disclosure may be realized by means and combinations thereof set forth in claims.

According to an image conversion method of the present disclosure, original image data is separated into a front view image and a back view image for 3D conversion processing of the original image data, and a converted 3D image is generated by restoring a background space between the separated front view image and back view image using a 3D conversion processing neural network.

To this end, according to an image conversion method and apparatus of the present disclosure, a converted 3D image may be generated by processes of receiving original image data, separating the original image data into a front view image and a back view image, generating a background space between the front view image and the back view image, and restoring the background space between the separated front view image and back view image using a 3D conversion processing neural network.

Other aspects and features than those described above will become apparent from the following drawings, claims, and detailed description of the present disclosure.

According to the image conversion method and apparatus according to embodiments of the present disclosure, a 2D image is separated into a front view image, which is a main image, and a back view image, which is a background image of the front view image, and a 3D conversion processing neural network is selected and used to fill in an empty space between the separated front view image and back view image with the same environment as or a similar environment to the back view image environment so that the front view image can be seen as protruding. Accordingly, the embodiments of the present disclosure can efficiently and effectively convert a 2D image into a 3D image.

In detail, a processor of the image conversion apparatus includes information related to the distance to an object surface from the observation viewpoint in a photographed image, in order to convert a 2D image into a 3D image. Based on this information, the 2D image is separated into a front view image and a back view image on the basis of the viewpoint of a photographer or the viewpoint from where the image is photographed. An empty space may be generated between the separated front view image and back view image, and learning to fill in the generated empty space with an environment similar to the back view image may be performed, such that the front view image can be seen as protruding. As a result, a 3D image may be generated from the 2D image without separate equipment for photographing 3D images.

The effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
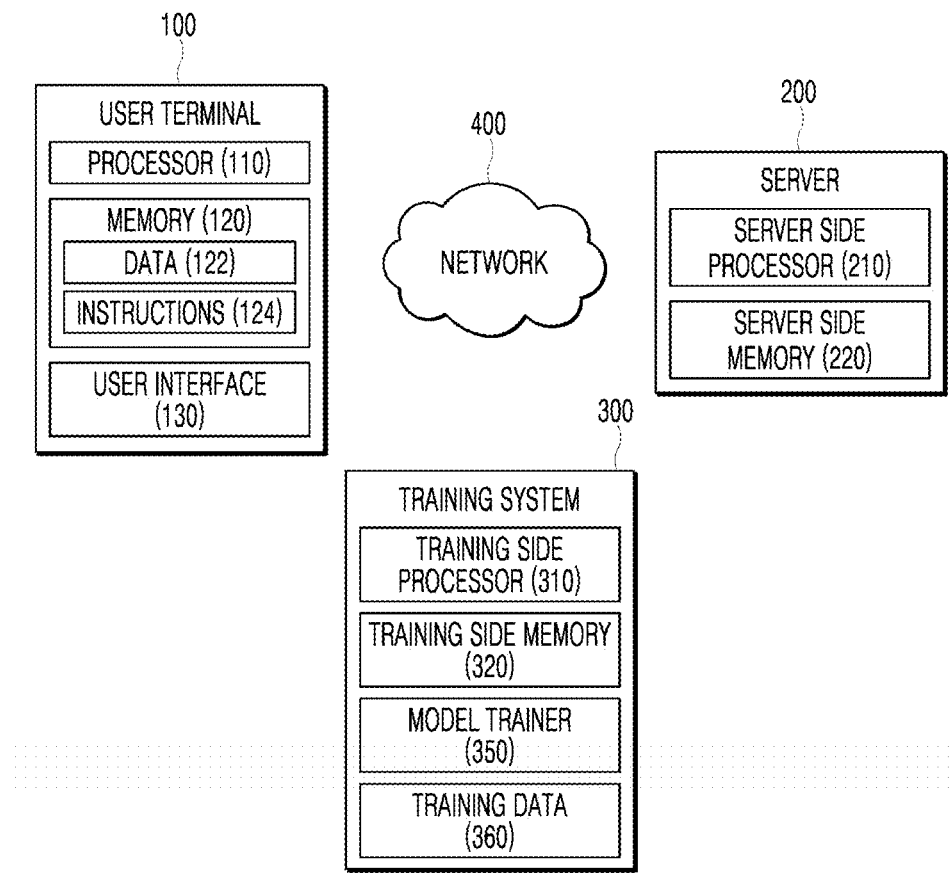
FIG. 1 is an exemplary diagram of an environment for performing an image conversion method according to an embodiment of the present disclosure.

Hereinafter the embodiments disclosed in this specification will be described in detail with reference to the accompanying drawings. The present disclosure may be embodied in various different forms and is not limited to the embodiments set forth herein. Hereinafter in order to clearly describe the present disclosure, parts that are not directly related to the description are omitted. However, in implementing an apparatus or a system to which the spirit of the present disclosure is applied, it is not meant that such an omitted configuration is unnecessary. Further, like reference numerals refer to like elements throughout the specification.

In the following description, although the terms "first", "second", and the like may be used herein to describe various elements, these elements should not be limited by these terms. These terms may be only used to distinguish one element from another element. Also, in the following description, the articles "a," "an," and "the," include plural referents unless the context clearly dictates otherwise.

In the following description, it will be understood that terms such as "comprise," "include," "have," and the like are intended to specify the presence of stated feature, integer, step, operation, component, part or combination thereof, but do not preclude the presence or addition of one or more other features, integers, steps, operations, components, parts or combinations thereof.

Hereinafter, the present disclosure will be described in detail with reference to the accompanying drawings.

FIG. 1 is an exemplary diagram of an environment for performing an image conversion method according to an embodiment of the present disclosure.

The environment for performing the image conversion method according to an embodiment of the present disclosure includes a user terminal 100, a server 200, a training system 300, and a network 400 that enables these components to communicate with each other.

The user terminal 100 may support object-to-object intelligent communication such as Internet of things (IoT), Internet of everything (IoE), and Internet of small things (IoST), and may support machine to machine (M2M) communication, device to device (D2D) communication, and the like.

In addition, the user terminal 100 may determine the image conversion method using big data, artificial intelligence (AI) algorithms, and/or machine learning algorithms in a 5G environment connected for the Internet of things.

The user terminal 100 may be, for example, any type of computing device such as a personal computer, a smartphone, a tablet, a game console, and a wearable device. The user terminal 100 may include one or more processors 110 and a memory 120.

The one or more processors 110 may include all types of devices capable of processing data, such as an MCU. Here, the 'processor' may refer to a data processing apparatus embedded in hardware having, for example, a physically structured circuits in order to perform a function represented as a code or an instruction included in a program.

Examples of the data processing apparatus embedded in hardware may include a microprocessor, a central processing unit (CPU), a processor core, a multiprocessor, an application-specific integrated circuit (ASIC), and a field programmable gate array (FPGA), but the scope of the present disclosure is not limited thereto.

The memory 120 may include one or more non-transitory storage media such as a RAM, a ROM, an EEPROM, an EPROM, flash memory devices, and magnetic disks. The memory 120 may store a plurality of instructions 124 that cause the user terminal 100 to perform operations when executed by data 122 and the processors 110.

In addition, the user terminal 100 may include a user interface 140 for receiving instructions from a user and transmitting output information to the user. The user interface 140 may include various input means such as a keyboard, a mouse, a touch screen, a microphone, and a camera, and various output means such as a monitor, a speaker, and a display.

The user may select an image to be processed in the user terminal 100 through the user interface 140. For example, the user may select an image to be viewed through the mouse, the keyboard, the touch screen, and the like. The selected image refers to any one of a 2D image which has been photographed or a 2D image which is being photographed, by the camera embedded in the user terminal 100.

According to an embodiment, the user terminal 100 may store or include a deep neural network to which artificial intelligence technology capable of converting the photographed 2D image into a 3D image is applied, various learning models such as other types of machine learning models, or technologies including these.

Artificial intelligence (AI) is an area of computer engineering science and information technology that studies methods to make computers mimic intelligent human behaviors such as reasoning, learning, self-improving, and the like, or how to make computers mimic such intelligent human behaviors.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

An ANN is a data processing system modeled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

Specifically, ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the ANN may include the synapse for connecting between neuron and neuron.

The ANN may be defined by the following three factors: (1) a connection pattern between neurons on different layers; (2) a learning process that updates synaptic weights; and (3) an activation function generating an output value from a weighted sum of inputs received from a previous layer.

The ANNs may include, but are not limited to, network models such as a deep neural network (DNN), a recurrent neural network (RNN), a bidirectional recurrent deep neural network (BRDNN), a multilayer perception (MLP), and a convolutional neural network (CNN).

The ANN may be classified as a single-layer neural network or a multi-layer neural network, based on the number of layers therein.

In general, a single-layer neural network may include an input layer and an output layer.

In general, the multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. The input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

The ANN can be trained using training data. Here, the training may refer to the process of determining parameters of the artificial neural network by using the training data, to perform tasks such as classification, regression analysis, and clustering of inputted data. Representative examples of parameters of the artificial neural network may include synaptic weights and biases applied to neurons.

An ANN trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

The learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a learning method that learns an artificial neural network to discover a pattern within given training data and perform classification by using the discovered pattern, rather than by using a correlation between given training data and labels corresponding to the given training data.

Examples of unsupervised learning may include clustering and independent component analysis.

Examples of artificial neural networks using unsupervised learning may include a generative adversarial network (GAN) and an autoencoder (AE).

A GAN is a machine learning method in which two different artificial intelligences, a generator and a discriminator, improve performance through competing with each other.

The generator may be a model creating new data that generate new data based on true data.

The discriminator may be a model recognizing patterns in data that determines whether inputted data is from the true data or from the new data generated by the generator.

Furthermore, the generator may receive and learn data that has failed to fool the discriminator, while the discriminator may receive and learn data that has succeeded in fooling the discriminator. Accordingly, the generator may evolve so as to fool the discriminator as effectively as possible, while the discriminator may evolve so as to distinguish, as effectively as possible, between the true data and the data generated by the generator.

An auto-encoder (AE) is a neural network which aims to reconstruct its input as output.

More specifically, an AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. In this case, since the number of nodes in the output layer is greater than the number of nodes in the hidden layer, the dimensionality of the data increases, thus data decompression or decoding may be performed.

Furthermore, in the AE, the inputted data may be represented as hidden layer data as interneuron connection strengths are adjusted through learning. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent may find an optimal path based on experience without reference to data.

Reinforcement learning may be performed primarily by a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. The one-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be used to minimize a cost function, and examples of such learning optimization algorithms may include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta, and RMSProp may include methods that increase optimization accuracy in SGD by adjusting the step size. In the SGD, the momentum and NAG may also include methods that increase optimization accuracy by adjusting the step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network may include not only the structure and learning optimization algorithms of the artificial neural network but also the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

The learning model to which the artificial intelligence technology as described above is applied may be first generated by the training system 300 through a training step, stored in the server 200, and then transmitted to the user terminal 100 through the network.

As a 3D conversion processing neural network, the learning model may be trained to process an image in order to output, as a 3D image, a 2D image which is stored in the user terminal 100 or photographed by the user terminal 100.

Typically, the learning model may be stored in the user terminal 100 in a state in which, having completed the training step in the training system 300, the learning model can be applied to the 2D image, but in some embodiments, the learning model may additionally be updated or upgraded through training in the user terminal 100.

Alternatively, the learning model stored in the user terminal 100 may be a part of the learning model generated in the training system 300. If necessary, a new learning model may be generated by the training system 300, and transmitted to the user terminal 100.

As another example, the learning model may be stored in the server 200 instead of being stored in the user terminal 100, and may provide required functions to the user terminal 100 in the form of a web service.

The server 200 includes a server side processor 210 and a server side memory 220, and may generally have larger processing power and larger memory capacity than the user terminal 100. Accordingly, according to the system implementation, heavy learning models that require more processing power for application may be configured to be stored in the server 200, and light learning models that require less processing power for application may be configured to be stored in the user terminal 100.

The user terminal 100 may select a suitable learning model according to an attribute of an image to be processed, from among various learning models. In one example, the user terminal 100 may be configured to use the learning model stored in the user terminal 100 when a light learning model is required, and may be configured to use the learning model stored in the server 200 when a heavy learning model is required.

The learning models included in the user terminal 100 or the server 200 may be the 3D conversion processing neural network generated by the training system 300.

Figure 2:
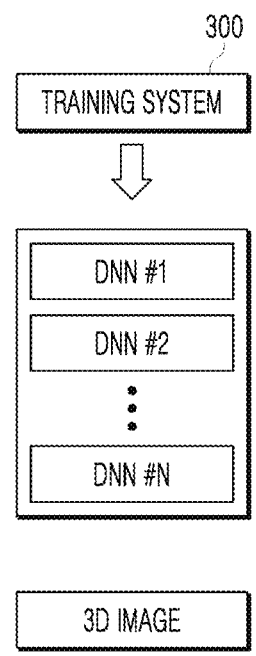
FIG. 2 is a diagram illustrating a system for generating a 3D conversion processing neural network according to an embodiment of the present disclosure.

FIG. 2 is a diagram illustrating a system for generating a 3D conversion processing neural network according to an embodiment of the present disclosure.

The training system 300 may include one or more training side processors 310 and a training side memory 320. In addition, the training system 300 may also include a model trainer 350 and training data 360 for training machine learning models.

The training system 300 may generate a plurality of learning models based on the training data 360 via the model trainer 350.

If the training data 360 selects a 2D image from the original image data stored in the user terminal 100 or the original image data photographed through the user terminal 100, the training system 300 may generate a 3D conversion processing neural network, which is a learning model that can convert the selected image into a 3D image.

Furthermore, in addition to an image, the training system 300 may generate a 3D video conversion processing neural network, which is a learning model that can convert a 2D video stored in the user terminal 100 or filmed by the user terminal 100 into a 3D video.

Here, the higher the resolution of the image or the higher the complexity of the photographed image (for example, the higher the number of photographed objects and the number of people), the higher the complexity of conversion into 3D. For example, if the same image processing algorithm is applied, the image conversion processing time of an image having a large number of objects or people may be longer than that of an image having a smaller number of objects or people, since in the former there are more objects to be converted into 3D.

Therefore, in order to obtain the best 3D image, it may be preferable to apply a 3D conversion processing neural network that separates the original image data into a front view image, which may be a main image of the 3D image, and a back view image, which may be a background image of the main image, and converts the 2D image into a 3D image. For example, in the case of converting a 2D image having a large number of objects (for example, when two or more objects are photographed in one image) into a 3D image, a 3D conversion processing neural network having four hidden layers may be used. However, in the case of converting a 2D image having a smaller number of objects (for example, when only one object is photographed in one image) into a 3D image, a 3D conversion processing neural network having two hidden layers may be used.

In addition, depending on the initial configuration of the neural network, the training system 300 may generate a 3D conversion processing neural network with a high complexity that has a longer processing time but provides better performance, and may generate a 3D conversion processing neural network with a lower complexity that provides lower performance but shortens the processing time.

As such, the training system 300 may form a learning model group including learning models having various complexities that can convert one 2D image including a plurality of objects into a 3D image.

Here, the complexity of the 3D conversion processing neural network is determined by the number of input nodes, the number of features, the number of objects, the number of hidden layers, and the like. It may be understood that the larger the number of features, the larger the number of objects, and the greater the number of hidden layers, the higher the complexity. In addition, a neural network may also be referred to in terms of weight, such that the greater the number of objects and the greater the number of hidden layers, the heavier the neural network. In addition, the complexity of the neural network may be referred to as the dimensionality of the neural network.

The higher the complexity of the neural network, the better the image conversion performance, but the longer the time required for the image processing. On the contrary, the lighter the neural network, the relatively lower the image conversion performance, but the shorter the time required for the image processing.

Figure 3:
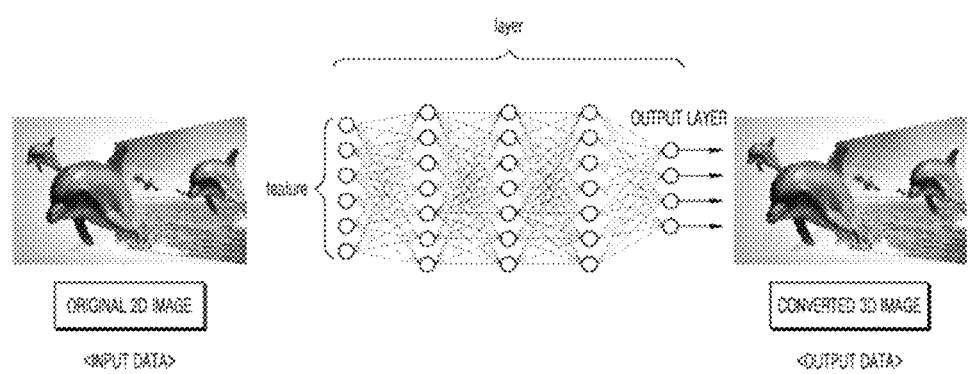
FIG. 3 is a diagram for describing the 3D conversion processing neural network according to an embodiment of the present disclosure.

FIG. 3 is a diagram for describing the 3D conversion processing neural network according to an embodiment of the present disclosure.

The 3D conversion processing neural network may be configured to include an input layer, a hidden layer, and an output layer. The number of input nodes is determined according to the number of features, the number of objects, and the like, and as the number of nodes increases, the complexity or dimensionality of the neural network increases. In addition, as the number of hidden layers increases, the complexity or dimensionality of the neural network increases.

The number of features, the number of input nodes, the number of hidden layers, and the number of nodes in each layer may be determined by the designer of the neural network. As the complexity increases, more processing time is required, but better performance may be achieved.

Once the initial neural network structure has been designed, the neural network may be trained with training data. In order to implement a neural network for image conversion, an original 2D image and a 3D image version of the image are required. By collecting the original 2D image, extracting the object or the like that may be a main image as the front view image from the image, and extracting the image other than the object extracted as the front view image as the back view image, a 3D image corresponding to the original 2D image may be prepared.

By linking the original 2D image corresponding to the 3D image with a label, training data for training the neural network for image conversion is prepared.

Here, by using training data including the original 2D image having a large number of objects as training data, a 3D conversion processing neural network optimized for converting the original 2D image into a 3D image can be obtained.

In the same way, by training the neural network with training data including an original 2D original image having a small number of objects, a 3D conversion processing neural network optimized for converting the original 2D image into an optimal 3D image in a minimum amount of time may be obtained.

The processing speed and processing performance of the 3D conversion processing neural network may be in a trade-off relationship. A designer may determine whether to enhance the processing speed or the processing performance by changing the initial structure of the neural network.

The designer can set the structure of the neural network in consideration of the number of objects included in one 2D image, and train the corresponding neural network. Accordingly, it is possible to acquire a 3D conversion processing neural network that can be optimally used according to the number of objects included in one 2D image.

Figure 4:
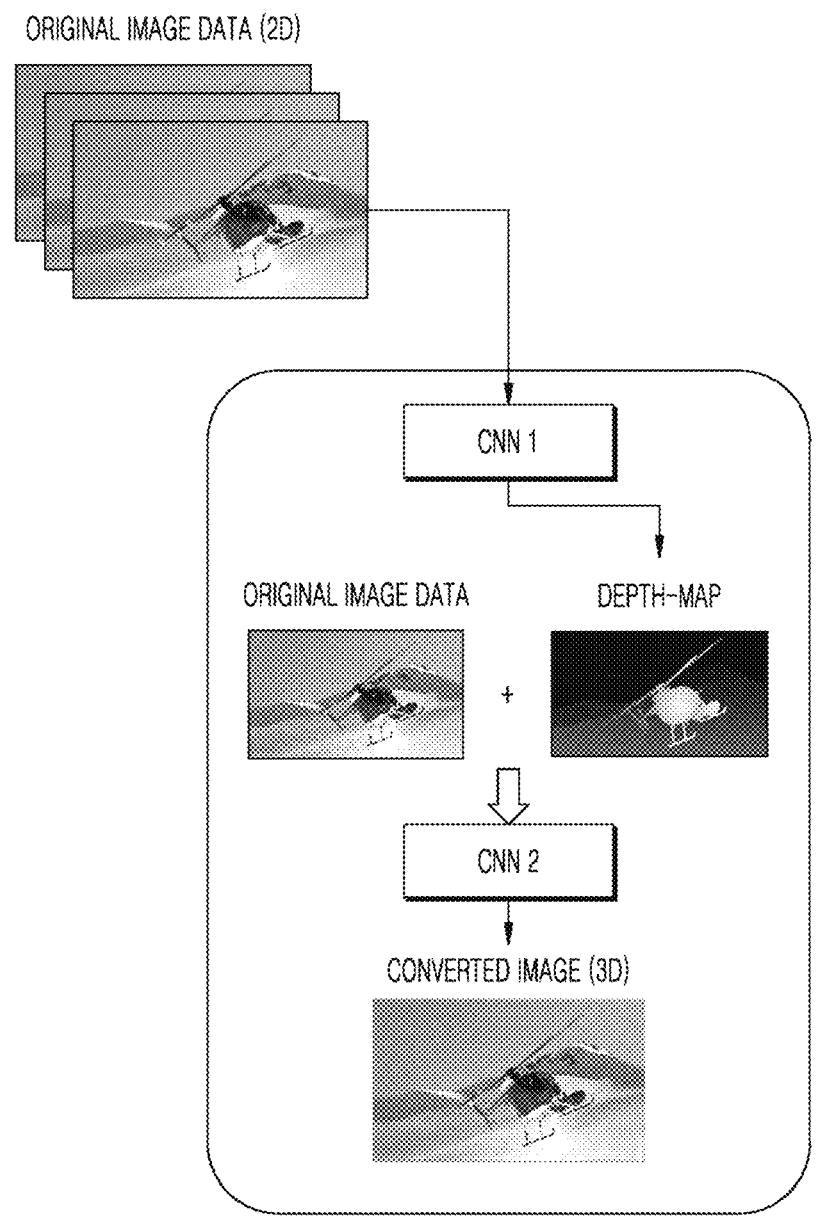
FIG. 4 is a diagram for describing an image conversion method according to an embodiment of the present disclosure.
Figure 5:
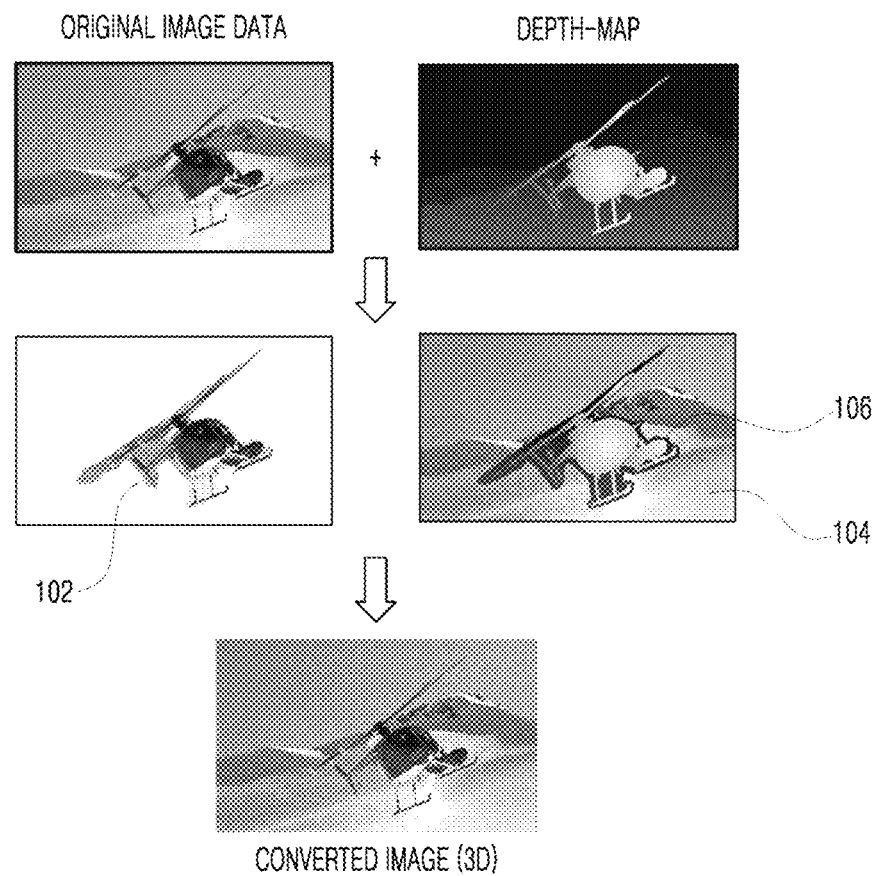
FIG. 5 is a diagram for schematically describing a 3D image conversion process according to an image conversion method according to an embodiment of the present disclosure.
Figure 6:
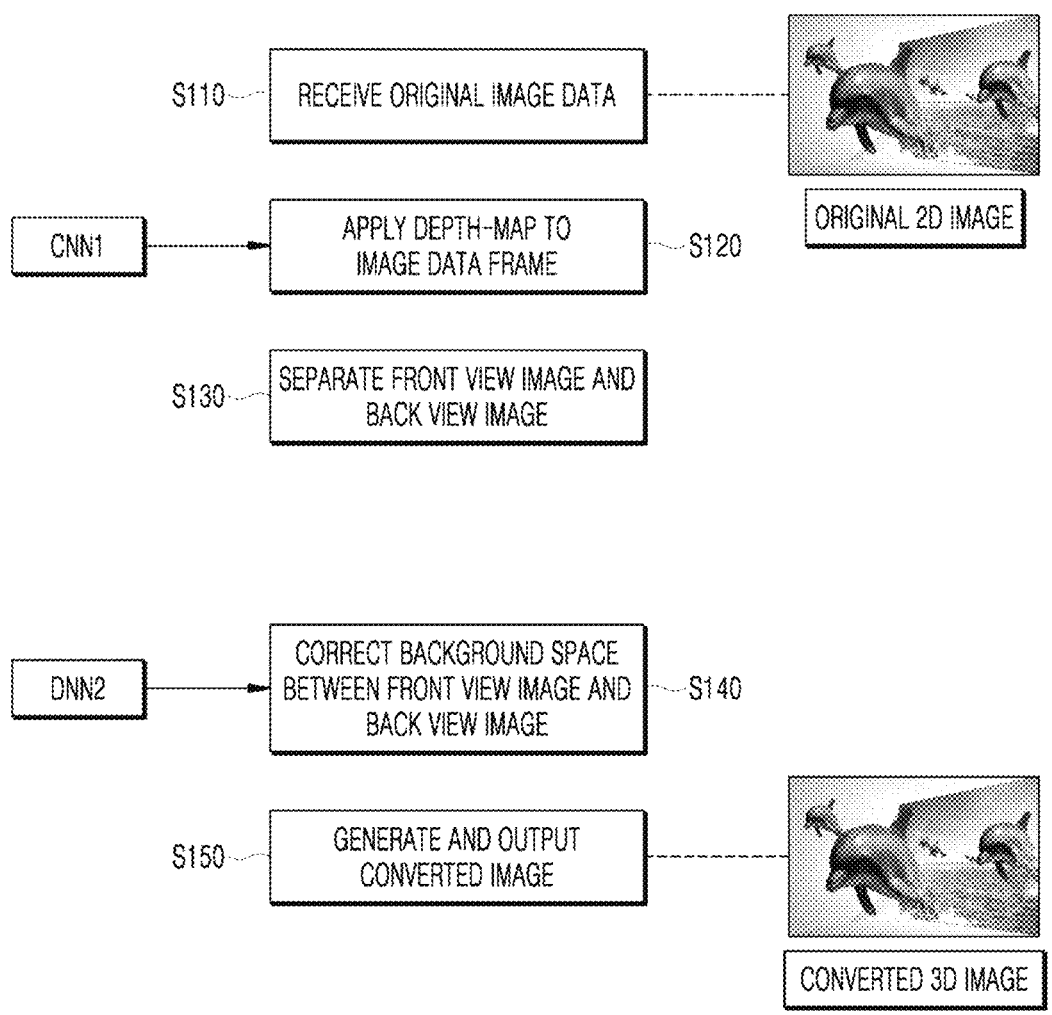
FIG. 6 is a flowchart for describing the image conversion method according to an embodiment of the present disclosure.

FIG. 4 is a diagram for describing an image conversion method according to an embodiment of the present disclosure, FIG. 5 is a diagram for schematically describing a 3D image conversion process according to an image conversion method according to an embodiment of the present disclosure, and FIG. 6 is a flowchart for describing the image conversion method according to an embodiment of the present disclosure.

First, original image data for image conversion may be received through the image conversion apparatus (S110). The received image may be photographed by an apparatus equipped with a camera, may be an image stored in the user terminal 100, or alternatively, may be an image received through wired or wireless communication from an external device. The image enhancing apparatus may be a general user terminal such as a computer, a smartphone, and a tablet, and may be a server that performs image conversion for receiving and improving an image.

The received image may be a multi-frame image. In a case where a multi-frame image is inputted, when the image is processed for image conversion, an image classified according to the number of objects may be inputted to the learning model and used to acquire a 3D image.

The image proposed as an example in FIGS. 4 and 5 presents a part of a photographed image of a helicopter, and is represented as a 2D image.

In order to convert the 2D image into a 3D image, the processor of the image conversion apparatus may apply a depth-map CNN1, among the image processing neural networks, to the photographed image (S120). A depth-map refers to one image or one channel of an image that includes information related to a distance to an object surface from an observation viewpoint.

The 2D image to which the depth-map is applied is separated into a front view image and a back view image based on, for example, a viewpoint from where a user captured the photograph or a viewpoint from where the user focused the camera for photographing (S130).

In detail, when the original image data is separated into the front view image and the back view image, a main object may be identified among the objects included in the original image by using the image analysis neural network.

The main object may be a main image among objects and people (for example, a person, a car, an animal, and the like) that is capable of moving. An image analysis neural network capable of supervised learning can be trained in advance using these main objects.

In this way, if the main object is identified based on the trained information on the main object, the identified main object may be classified as a front view image. On the contrary, the remaining images other than the front view image are classified as back view images.

By contrast, when the original image data is separated into the front view image and the back view image, a focus analysis neural network may identify a focused object among the objects included in the original image.

In this case, the focused object refers to an object that, when a picture is taken, is selected as the focus and photographed. The focus information is included in the target photograph, and the focus analysis neural network analyzes the target photograph based on the focus information and recognizes the object that is the focal point as the main object.

As such, when the focus analysis neural network identifies the main object, the focused object may be classified as the front view image, and the part other than the front view image may be classified as the back view image.

When the image is separated into the front view image and the back view image, a background space may be generated between the separated front view image and the back view image (S140). In detail, since the image is separated into the front view image and the back view image, an empty space is generated between the front view image 102 and the back view image 104 (104 in FIG. 5). The generated empty space may be referred to as the background space, and the generated empty space may be corrected through a learning model CNN2, which is one of the 3D conversion processing neural networks, so as to generate a 3D image (S150).

For example, to correct the background space generated between the front view image 102 and the back view image 104, the empty space in the background space 106 between the front view image 102 and the back view image 104 may be filled in by image restoration based on the back view image 104 so as to generate the 3D image.

That is, since the front view image 102 may be the main image in the entire image, when the user looks at the image, the front view image 102 should be seen in three dimensions. To this end, the background space 106 around the front view image 102 may be replaced with an image of the same environment as the back view image 104 so that the background space 106 around the front view image 102 can display the front view image 102, such that the front view image 102 may be seen as protruding.

To this end, when the space between the front view image and the back view image is corrected, the space between the front view image and the back view image may be restored to be similar to the surrounding back view image based on an inpainting technique. An inpainting technique refers to a technique of filling in a deleted part of an image based on learned information such that the deleted part of the image becomes similar to the surrounding image.

In addition, in an embodiment of the present disclosure, the inpainting technique capable of classifying a 2D image through a neural network for 3D image conversion is described as an example, but in addition to the inpainting technique, any technology capable of converting a 2D image into a 3D image may be used.

The neural network for image conversion that converts the 2D image into the 3D image may be formed using various models, such as a convolutional neural network (CNN), a full-convolutional neural network (FCNN), a region-based convolutional neural network (R-CNN), You Only Look Once (YOLO), and the like.

After the empty space between the front view image and the back view image is corrected, the converted 3D image may be generated and outputted (S150). In this case, the converted 3D image may be outputted through the user terminal 100 or stored in the server 200.

Figure 7:
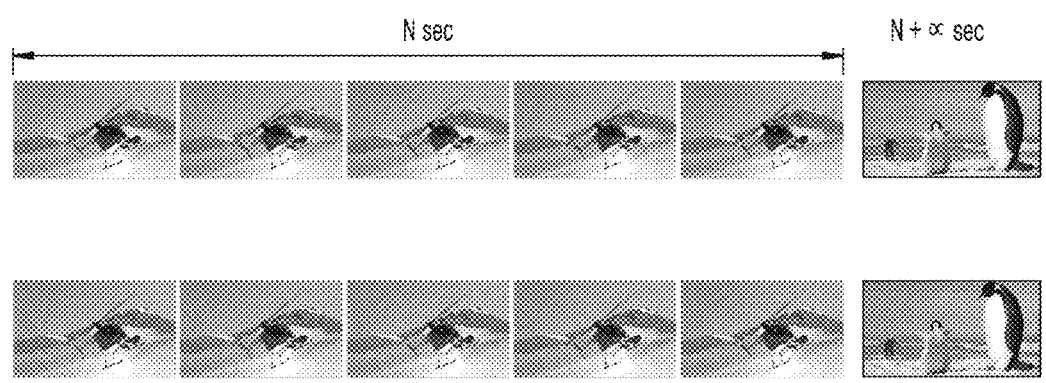
FIG. 7 is a diagram for describing a 3D image conversion process of consecutive frames according to an image conversion method according to an embodiment of the present disclosure.
Figure 8:
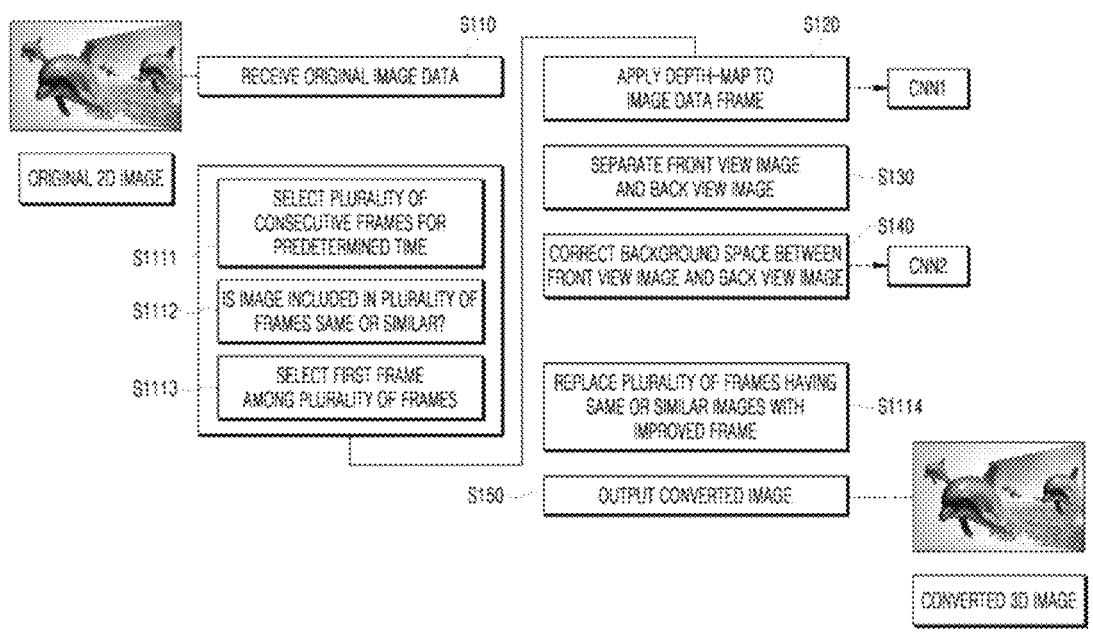
FIG. 8 is a flowchart for describing a method of 3D image conversion of consecutive frames according to an embodiment of the present disclosure.

FIG. 7 is a diagram for describing a 3D image conversion process of consecutives frame according to an image conversion method according to an embodiment of the present disclosure, and FIG. 8 is a flowchart for describing a method of 3D image conversion of consecutive frames according to an embodiment of the present disclosure.

Referring to FIGS. 7 and 8, the original image data for image conversion may be received through the image conversion apparatus (S110). The received image may be an image photographed by an apparatus equipped with a camera, may be an image stored in the user terminal 100, or alternatively, may be an image received through wired or wireless communication from an external device. The image enhancing apparatus may be a general user terminal such as a computer, a smartphone, and a tablet, and may be a server that performs image conversion for receiving and improving an image.

The received image may be an image in which several image frames are consecutively arranged for less than a predetermined time (S1111). For example, the received image may be a video generated by combining several images, or may be several images photographed similarly and/or identically. When the number of objects, the number of people, and the arrangement of objects and people in the consecutive images are the same, the time for generating the converted images may increase if several images are consecutively generated as converted 3D images.

To reduce the time for generating the converted images, when several of the consecutive images are the same or similar images, non-converted image frames may be replaced with a converted 3D image.

Specifically, it may be determined whether a plurality of image frames that are consecutively arranged for less than a predetermined time are the same or similar (S1112). As described above, when objects, people, and the arrangement of the environment included in each image are similar or the same, it may be determined that each image is the same or similar.

When the plurality of consecutive image frames are the same or similar, frames that have the same or similar image among the plurality of consecutive image frames are grouped. Thereafter, the first image frame of the generated group may be selected, and the front view image and the back view image of the selected first image frame may be separated (S1113 and S120).

In detail, referring to FIG. 7, when several images are arranged consecutively and it is determined that the consecutively arranged several images are the same image, the first image is selected from among the same images.

The selected first image frame may be separated into a front view image and a back view image by applying a depth-map (S120). The image separated into the front view image and the back view image may be converted into a 3D image through the 3D conversion processing neural network (S140).

Upon conversion of the first image frame among the plurality of images into the 3D image through the 3D conversion processing neural network, the other images of the plurality of consecutive image frames that have the same or similar image may be replaced with the 3D image of the converted first image frame (S1114).

That is, the human eye recognizes consecutive image frames reproduced at 10 to 12 frames per second as a movement (moving image). For example, when 11 frames are reproduced in one second, and another other 11 frames are reproduced in the following one second, the human eye recognizes an moving image reproduced for two seconds. Based on these characteristics of the human eye, it is assumed that one image and other images are consecutively arranged for less than one second. Hence, even when one image is converted into a converted 3D image and then images photographed in the same or a similar environment are replaced with the converted 3D image, a viewer who views a video generated by the images may recognize the images as the same image. Therefore, after converting to 3D only the first image frame of several images photographed with the same configuration, even when the remaining several images of the same configuration are replaced with the converted 3D image, during reproduction of the images as a video, the viewer recognizes the 2D video as a 3D video.

In the embodiment described above in which the plurality of image frames are replaced with one converted 3D image, since the plurality of image frames are consecutively arranged for less than a predetermined time, the plurality of consecutive image frames is based on the time when a flickering effect occurs. In other words, even when the plurality of image frames are replaced with one converted 3D image, the user may not recognize the difference.

When the same or similar images are consecutive for a predetermined time, after the first image frame among the plurality of consecutive images is converted into a 3D image, the same or similarly photographed images are replaced with the converted 3D image. Accordingly, it is possible to prevent the generation of a time delay due to consecutively generating several images as converted 3D images.

However, unlike the above, in the received image, a plurality of image frames may be consecutively arranged for longer than the predetermined time. In this case, the remaining other images may be converted into 3D images based on the 3D image generated from the first image frame among the plurality of consecutive image frames.

That is, the background space of the remaining images may be corrected based on the method for restoring the background space (106 of FIG. 5) generated when converting to 3D the first image among several images photographed as similar images. Accordingly, the time required for the 3D image conversion of similar images may be reduced.

As described above, a 2D image is separated into the front view image, which is the main image, and the back view image, which is the background image of the front view image, and a 3D conversion processing neural network is selected and used to fill in the empty space between the separated first view image and back view image with the same environment as or a similar environment to the back view image environment so that the front view image can be seen as protruding. Accordingly, the embodiments of the present disclosure can efficiently and effectively convert 2D images into 3D images.

In detail, the processor of the image converting apparatus includes information related to the distance to an object surface from the observation viewpoint in a photographed image, in order to convert the 2D image into the 3D image. Based on this information, the 2D image is separated into the front view image and the back view image on the basis of the viewpoint of the photographer or the viewpoint from where the image is photographed. An empty space may be generated between the separated front view image and back view image, and learning to fill in the generated empty space with the environment similar to the back view image may be performed, such that the front view image can be seen as protruding. As a result, a 3D image can be generated from the 2D image without separate equipment for photographing 3D images.

In addition, when the images are consecutive images, and the structures of objects, people, and environments included in the consecutive images are the same or similar, only the first image frame among the consecutive images is converted into the 3D image, and the remaining images in which the structures of the objects, people, and environments are the same or similar are replaced with the converted 3D images. As a result, the time required for 3D image conversion of a video may be reduced.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. Also, the steps included in the methods according to the present disclosure may be performed through the processor or modules for performing the functions of the step. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations can be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method for converting a 2D image into a 3D image, the method comprising:
    receiving original image data;
    separating the original image data into a front view image and a back view image for 3D conversion processing of the original image data;
    generating a background space between the front view image and the back view image; and
    generating a converted 3D image by restoring the background space between the separated front view image and the back view image using a 3D conversion processing neural network,
    wherein the original image data is a plurality of image frames that are consecutively arranged for less than a predetermined time, and
    wherein the separating comprises:
    grouping frames that have the same or a similar image among the plurality of consecutive image frames; and
    separating the front view image and the back view image of a first image frame among the frames in the same or similar image frame group.

2. The method of claim 1, wherein the separating comprises separating the front view image and the back view image using a depth-map, among image processing neural networks.

3. The method of claim 1, wherein the separating comprises:
    identifying a main object among objects included in the original image using an image analysis neural network;
    classifying an image of the main object as the front view image; and
    classifying a part other than the front view image as the back view image.

4. The method of claim 1, wherein the separating comprises:
    identifying a focused object among the objects included in the original image using a focus analysis neural network;
    classifying the focused object as the front view image; and
    classifying a part other than the front view image as the back view image.

5. The method of claim 1, wherein the generating of the converted image comprises restoring the background space based on the back view image.

6. The method of claim 5, wherein the generating of the converted 3D image comprises restoring the background space between the front view image and the back view image such that the background space is similar to a periphery of the back view image, based on an inpainting technique.

7. The method of claim 1, wherein the generating of the converted 3D image comprises:
    generating the 3D image for the first image frame; and
    replacing other images of the image frame group with the 3D image for the first image frame.

8. The method of claim 1,
    wherein the original image data is a plurality of consecutive image frames, and
    wherein, in a case where the original image data is similar even after a predetermined time, the separating comprises generating 3D images of the image frames other than the first image frame based on the 3D image generated from the first image frame among the plurality of consecutive image frames.

9. A non-transitory computer-readable recording medium in which a computer program for executing the method of claim 1 using a computer is stored.

10. An apparatus for converting a 2D image into a 3D image,
    the apparatus comprising:
    a processor; and
    a memory configured to be connected to the processor,
    wherein the memory stores instructions configured to, when executed by the processor, cause:
    reception of original image data;
    separation of the original image data into a front view image and a back view image for 3D conversion processing of the original image data;
    generation of a background space between the front view image and the back view image; and
    generation of a converted 3D image by restoring the background space between the separated front view image and the back view image using a 3D conversion processing neural network,
    wherein the original image data is a plurality of image frames that are consecutively arranged for less than a predetermined time, and
    wherein the instructions are configured to, when separating the front view image and the back view image, cause:
    grouping of frames that have the same or a similar image among the plurality of consecutive image frames; and separation of the front view image and the back view image of a first image frame among the frames in the same or similar image frame group.

11. The apparatus of claim 10, wherein the instructions are configured to cause separation of the front view image and the back view image using a depth-map neural network, among image processing neural networks.

12. The apparatus of claim 10, wherein the instructions are configured to cause:
- identification of a main object among objects included in the original image using an image analysis neural network;
- classification of an image of the main object as the front view image; and
- classification of a part other than the front view image as the back view image.

13. The apparatus of claim 10, wherein the instructions are configured to cause:
- identification of a focused object among the objects included in the original image using a focus analysis neural network;
- classification of the focused object as the front view image; and
- classification of a part other than the front view image as the back view image.

14. The apparatus of claim 10, wherein the instructions are configured to cause restoration of the background space based on the back view image.

15. The apparatus of claim 14, wherein the instructions are configured to cause restoration of the background space between the front view image and the back view image such that the background space is similar to a periphery of the back view image, based on an inpainting technique.

16. The apparatus of claim 10, wherein the instructions are configured to cause:
- generation of the 3D image for the first image frame; and
- replacement of other images of the image frame group with the 3D image for the first image frame.

17. The apparatus of claim 10,
wherein the original image data is a plurality of consecutive image frames, and
wherein, in a case where the original image data is similar even after a predetermined time, the instructions are configured to cause generation of 3D images of the image frames other than the first image frame based on the 3D image generated from the first image frame among the plurality of consecutive image frames, when separating the original image data into the front view image and the back view image.

* * * * *